United States Patent
Schmidt et al.

(10) Patent No.: US 10,131,375 B2
(45) Date of Patent: Nov. 20, 2018

(54) VEHICLE STEERING SYSTEM

(71) Applicant: Bayerische Motoren Werke Aktiengesellschaft, Munich (DE)

(72) Inventors: Roland Schmidt, Stockdorf (DE); Hubert Scholz, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 8 days.

(21) Appl. No.: 15/429,235

(22) Filed: Feb. 10, 2017

(65) Prior Publication Data

US 2017/0151975 A1 Jun. 1, 2017

Related U.S. Application Data

(63) Continuation of application No. PCT/EP2015/065894, filed on Jul. 10, 2015.

(30) Foreign Application Priority Data

Aug. 13, 2014 (DE) .................. 10 2014 216 140

(51) Int. Cl.
  *B62D 1/181* (2006.01)
  *B62D 1/28* (2006.01)
  (Continued)

(52) U.S. Cl.
  CPC .......... *B62D 1/181* (2013.01); *B60N 2/0232* (2013.01); *B62D 1/04* (2013.01); *B62D 1/183* (2013.01); *B62D 1/28* (2013.01)

(58) Field of Classification Search
  CPC .......... B62D 1/181; B62D 1/04; B62D 1/183; B60N 2/0232
  (Continued)

(56) References Cited

U.S. PATENT DOCUMENTS

| 4,892,330 A | * | 1/1990 | Beauch | B62D 1/184 |
| | | | | 280/775 |
| 5,606,892 A | * | 3/1997 | Hedderly | B62D 1/16 |
| | | | | 280/775 |

(Continued)

FOREIGN PATENT DOCUMENTS

| DE | 196 45 404 A1 | 8/1997 |
| DE | 10 2006 006 995 A1 | 8/2007 |

(Continued)

OTHER PUBLICATIONS

International Search Report (PCT/ISA/210) issued in PCT Application No. PCT/EP2015/065894 dated Oct. 1, 2015 with English translation (seven pages).

(Continued)

*Primary Examiner* — Toan C To
(74) *Attorney, Agent, or Firm* — Crowell & Moring LLP

(57) ABSTRACT

A steering system for a motor vehicle includes a steering handle for manual actuation of the steering system, at least one steerable motor vehicle wheel which can be mechanically coupled to the steering handle, and a steering column which is rotatable about a steering-system axis and has an input shaft connected fixedly to the steering handle and an output shaft connected to the at least one steerable motor vehicle wheel for rotation therewith. A steering-system-blocking element is connected fixedly to a body of the motor vehicle. A locking device can either enable or block a relative rotation between the input shaft and the body-mounted steering-system-blocking element. A coupling device can either enable or block a relative rotation between the input shaft and the output shaft.

14 Claims, 5 Drawing Sheets

(51) Int. Cl.
*B60N 2/02* (2006.01)
*B62D 1/04* (2006.01)
*B62D 1/183* (2006.01)

(58) Field of Classification Search
USPC .......................... 280/775, 777; 74/492, 493
See application file for complete search history.

(56) References Cited

U.S. PATENT DOCUMENTS

| | | | | |
|---|---|---|---|---|
| 5,678,454 | A * | 10/1997 | Cartwright | B62D 1/184 |
| | | | | 74/493 |
| 5,835,870 | A | 11/1998 | Kagawa | |
| 2008/0150270 | A1* | 6/2008 | Longo | B62D 1/184 |
| | | | | 280/775 |
| 2011/0041642 | A1* | 2/2011 | Havlicek | B62D 1/184 |
| | | | | 74/493 |
| 2013/0002416 | A1 | 1/2013 | Gazit | |
| 2014/0096638 | A1* | 4/2014 | Buzzard | B62D 1/184 |
| | | | | 74/493 |
| 2014/0137693 | A1* | 5/2014 | Buzzard | B62D 1/184 |
| | | | | 74/493 |
| 2014/0318303 | A1* | 10/2014 | Sugiura | B62D 1/18 |
| | | | | 74/493 |
| 2014/0331810 | A1* | 11/2014 | Okano | B62D 1/187 |
| | | | | 74/493 |
| 2015/0353123 | A1* | 12/2015 | Jyota | B62D 1/184 |
| | | | | 74/493 |
| 2016/0016604 | A1* | 1/2016 | Johta | B62D 1/184 |
| | | | | 74/493 |
| 2016/0132725 | A1* | 5/2016 | Sakata | G06K 9/00604 |
| | | | | 701/36 |

FOREIGN PATENT DOCUMENTS

| | | |
|---|---|---|
| DE | 10 2010 051 939 A1 | 5/2012 |
| EP | 1 985 520 A1 | 10/2008 |
| JP | 2012-40977 A | 3/2012 |

OTHER PUBLICATIONS

German-language Written Opinion (PCT/ISA/237) issued in PCT Application No. PCT/EP2015/065894 dated Oct. 1, 2015 (six pages).

German Search Report issued in counterpart German Application No. 10 2014 216 140.1 dated Apr. 13, 2015 with partial English translation (11 pages).

* cited by examiner

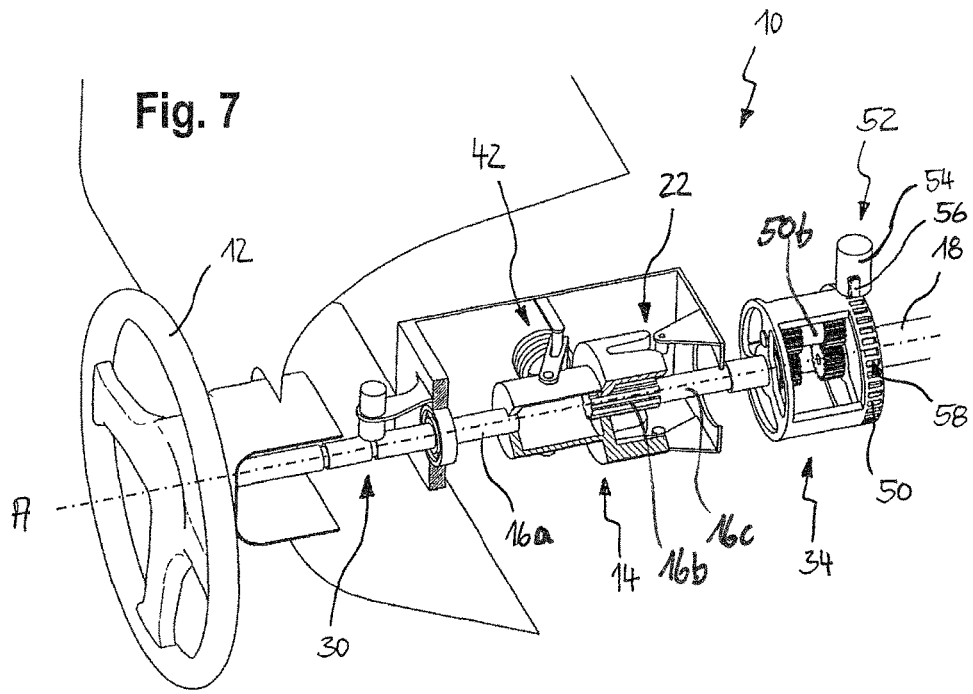
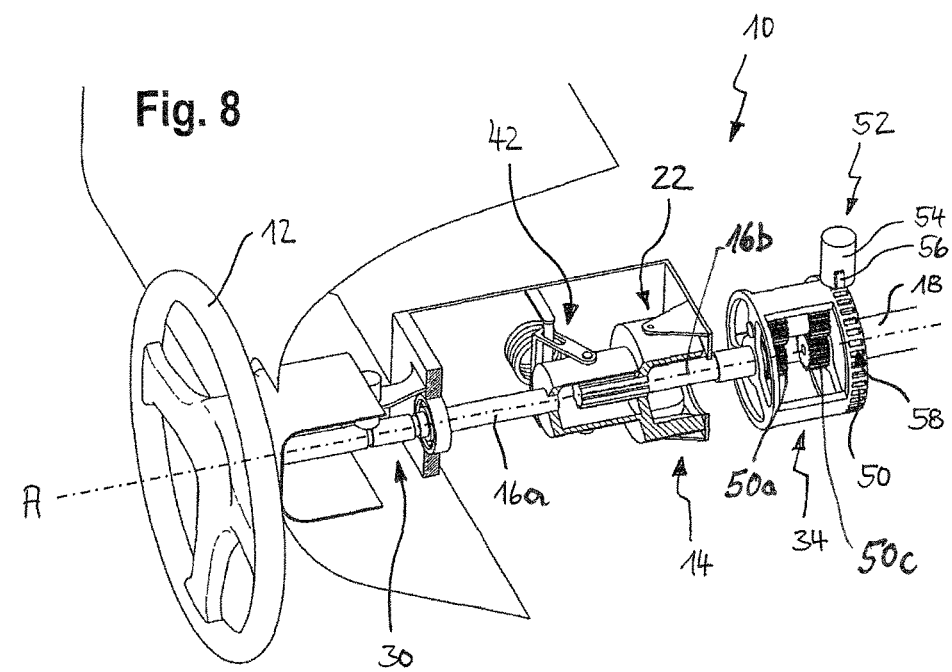

VEHICLE STEERING SYSTEM

CROSS REFERENCE TO RELATED APPLICATIONS

This application is a continuation of PCT International Application No. PCT/EP2015/065894, filed Jul. 10, 2015, which claims priority under 35 U.S.C. § 119 from German Patent Application No. 10 2014 216 140.1, filed Aug. 13, 2014, the entire disclosures of which are herein expressly incorporated by reference.

BACKGROUND AND SUMMARY OF THE INVENTION

The invention concerns a steering system of a vehicle, especially of a motor vehicle.

Vehicle steering systems, as is known, comprise a steering handle, especially a steering wheel, for manual actuation of the steering system. The steering wheel is coupled by a steering column to at least one steerable vehicle wheel, and by turning the steering column about a steering system axis this at least one vehicle wheel can be steered, i.e., its toe angle can be adjusted.

Motor vehicle steering systems are already known from the prior art in which the steering wheel can be adjusted in the axial direction and/or transversely to the axial direction. In this way, comfort functions are provided, for example making it easier to get into and out of the vehicle, as well as enabling an adaptation of the steering wheel position to the body height of the driver.

By the term "highly automated driving" is meant initiatives in the automotive industry for handing over the control and thus, in particular also the steering, of the motor vehicle, in the manner of an autopilot to an electronic controlling and computing unit (so-called onboard computer) so that the driver no longer needs to perform any driving tasks (or at least not continually) and can devote himself (temporarily) to other activities.

However, it turns out that the steering wheel rotation during the automatic actuation of the steering system in the highly automated driving mode is perceived as annoying by the driver and, furthermore, unintentional steering interventions by the driver can occur.

Therefore, it is an object of the invention to create a vehicle steering system which enhances the comfort for the driver during highly automated driving and prevents unintentional manual steering interventions of the driver.

This and other objects are achieved according to the invention by a steering system for a motor vehicle, with a steering handle for the manual actuation of the steering system, at least one steerable motor vehicle wheel which can be mechanically coupled to the steering handle, a steering column which is rotatable about a steering system axis and has an input shaft connected fixedly to the steering handle and an output shaft which can be coupled to the input shaft and whose rotary movement produces a steering movement of the steerable vehicle wheel via a steering gearbox, as well as a steering system blocking element, which is connected fixedly to a body of the motor vehicle. A locking device is provided which can optionally enable or block a relative rotation between the input shaft and the body-mounted steering system blocking element. A coupling device is provided, which can optionally enable or block a relative rotation between the input shaft and the output shaft. In this way, the input shaft, which is connected fixedly to the steering handle (no relative rotation between the input shaft and the steering handle) can be decoupled from the output shaft with little effort and fixed to the vehicle body during highly automated driving.

As a result of this decoupling of the steering handle from the at least one steerable motor vehicle wheel, unintentional manual steering interventions are effectively prevented. Moreover, the driver can use the steering wheel (=steering handle) locked to the vehicle body as a fixed support, for example, which contributes to enhanced driving comfort during the highly automated driving.

The locking device connected between the input shaft and the body-mounted steering system blocking element is, for example, a coupling, especially a jaw coupling.

In one possible embodiment of the steering system according to the invention, the steering handle is arranged so as to be axially movable for the actuation of the locking device. Such an actuating of the locking device is perceived by the driver as especially intuitive and thus likewise contributes to enhanced driving comfort.

It is preferably provided in this embodiment that the locking device in a first axial position of the steering handle enables a relative rotation between the input shaft and the body-mounted steering system blocking element and in a second axial position of the steering handle it blocks a relative rotation between the input shaft and the body-mounted component, wherein the steering handle in the second axial position has a shorter axial distance from the output shaft than in the first axial position. Thus, the steering handle when not in use (e.g., in its already mentioned function as a fixed support) is further away from the driver during the highly automated driving than in its actual function for manual steering system actuation. This larger axial spacing between the driver and the steering handle during highly automated driving also has a positive impact on driving comfort, since the driver enjoys more freedom of movement during highly automated driving.

Furthermore, a detent device can be provided, which axially fixes the steering handle in the first axial position and/or in the second axial position viewed in the axial direction (of the steering column). In this way, an unintentional actuation of the locking device can be reliably prevented with little expense.

The detent device is, for example, an electromagnetically actuated detent device and it can optionally enable or block an axial displacement of the steering handle. Through the electromagnetic actuation, it is possible to take into account parameter ranges of sensor data in which a switch between automatic and manual actuation of the steering system should be allowed or prevented, with little expense. Relevant sensor data might be, inter alia, the steering angle or the speed of the vehicle, so that during cornering and/or when driving at high speed no switch between automatic and manual actuation of the steering system is possible, for example.

Furthermore, a spring element can be provided, which forces the steering handle of the vehicle steering system into the first axial position. Thus, the spring element can move the steering handle (after giving a warning to the driver) from the second axial position into the first axial position, in which the driver must once more manually take over the vehicle control. This is advantageous, for example, if a redundancy function of the vehicle steering system fails during the highly automated driving, so that while the steering system is still functional, it no longer affords the required failure safety.

Preferably, the steering handle can be moved between its first and second axial position, wherein a dead center device can be provided, which assumes an unstable position of equilibrium between the first and second axial position of the steering handle and applies force to the steering handle in the direction of the first or second axial position outside of the unstable position of equilibrium. Thus, the dead center device ensures, in a simple manner, that the locking device is either in its enabled position or in its blocked position, but not in an unwanted intermediate position.

According to another embodiment of the motor vehicle steering system, the coupling device is a coupling, especially a jaw coupling, wherein the steering handle is arranged so as to be preferably axially movable for the actuation of the coupling device. Such an actuation of the coupling device is perceived by the driver to be especially intuitive and consequently contributes to enhanced driving comfort.

In particular, the coupling device in a first axial position of the steering handle can block a relative rotation between the input shaft and the output shaft, and in a second axial position of the steering handle it can enable a relative rotation between the input shaft and the output shaft. Especially in connection with an axial actuation of the locking device, this produces an especially simple switchover between manual and highly automated driving. By simple axial displacement of the steering handle, the steering handle can be decoupled from the output shaft of the steering column and fixed to the body-mounted steering system blocking element (highly automated driving) or coupled to the output shaft firmly against twisting and turned with respect to the body-mounted steering system blocking element (manual driving).

According to another embodiment of a vehicle steering system according to the invention, the coupling device can be designed in the manner of a superposition gear. This can include a drive unit for the electromagnetic actuation of the steering system, as well as a superposition ring, which can be coupled to both the output shaft and the input shaft and either be blocked by the drive unit or be turned about the steering system axis. The drive unit is designed in particular as a worm drive and can provide a steering angle setpoint directly for the steering gearbox during the highly automated driving so that a redundant drive unit is no longer needed in the steering gearbox itself. Alternatively, the superposition ring instead of the drive unit can be blocked by a blocking unit or its rotation about the steering system axis can be enabled. The blocking unit can be electromagnetically activated and accordingly enable or block a relative rotation between the input shaft and the output shaft depending on prescribed parameters.

The coupling device and the locking device are preferably mechanically or electrically/electronically coupled together in a steering system according to the invention so that the coupling device assumes its enabled position in a blocked position of the locking device, and vice versa. Thus, the vehicle steering system has only two defined shifted states, which are assigned to "manual driving" or "highly automated driving". During manual driving, the locking device is in its enabled position and the coupling device is in its blocked position, while during highly automated driving the locking device is in its blocked position and the coupling device is in its enabled position.

Before explaining more closely the various features indicated thus far with the aid of possible figures represented in the enclosed figures (including further features and benefits of the invention), several other advantageous developments shall first of all be mentioned.

Thus, in a vehicle with a steering system according to the invention and a driver's seat adjustable by electric motor, the latter in the case of the second axial position of the steering handle, in which it has a shorter axial distance from the output shaft than in the first axial position, can be moved, actuated by an electronic control unit, into a position in which the driver's seat is also further away from the output shaft, viewed axially, than in the first mentioned axial position of the steering handle. In this way, the driver gets even more free space during the highly automated driving.

Moreover, it can be provided that an electronic control unit only enables an axial displacement of the steering handle toward the output shaft—whether initiated by the driver or initiated by an electromechanical servomechanism—when the vehicle can generally move in a highly automated driving mode or when the vehicle can be generally converted to the state of highly automated driving. The latter can be precluded especially during cornering and at relatively high speeds of travel. Moreover, such an electronic control unit can automatically initiate an axial displacement of the steering handle away from the output shaft (and thus toward the driver) when an error monitoring system for a highly automated driving mode of the vehicle identifies a safety-relevant error, which is why this state of the highly automated driver needs to be ended as quickly as possible. The corresponding returning of the steering handle to the driver can occur in this case electromechanically or, as already explained, by a suitable spring element.

Moreover, it can be provided that the steering handle in the second axial position (of highly automated driving) lies at least partially and at least approximately flush in a dashboard or the like of the vehicle at a shorter axial distance from the output shaft and then an indicator and/or operating unit for the driver is moved out of the dashboard into the direct visual field of the driver.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 7 is a schematic sketch of a third embodiment of the steering system according to the invention in a shifted state for "manual driving".

FIG. 8 is a further schematic sketch of the steering system according to FIG. 7 in a shifted state for "highly automated driving".

DETAILED DESCRIPTION OF THE DRAWINGS

Figure 1:
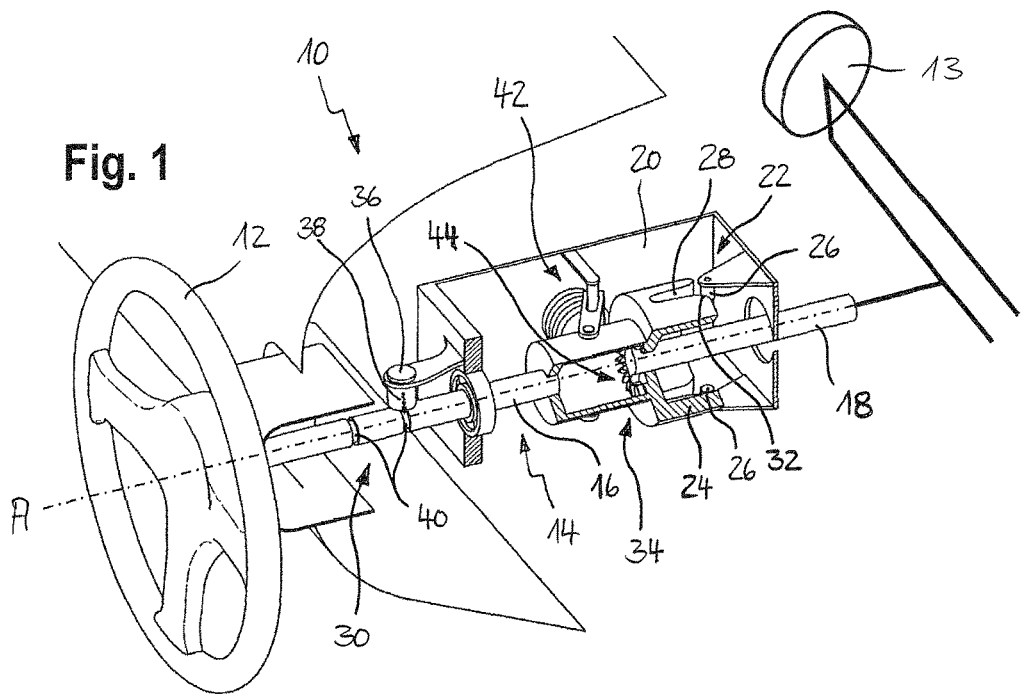
FIG. 1 is a schematic sketch of a first embodiment of the steering system according to the invention in a shifted state for "manual driving".

FIGS. 1 to 10 show, in each case, a schematic perspective view of a steering system 10 for a motor vehicle, with a steering handle 12 fashioned as a steering wheel for the manual actuation of the steering system 10, a steerable vehicle wheel 13 symbolically represented in FIG. 1, which can be mechanically coupled to the steering handle 12, a steering column 14 which is rotatable about a steering system axis A and has an input shaft 16 connected fixedly to the steering handle 12 and an output shaft 18 which can be coupled to the input shaft 16, whose rotary movement produces a steering movement of the steerable vehicle wheel 13 via a steering gearbox. Moreover, there is provided a steering system blocking element 20, which is connected fixedly to a body of the motor vehicle. The steering system 10 furthermore includes a locking device 22, which can optionally enable or block a relative rotation between the input shaft 16 and the body-mounted steering system blocking element 20.

In order to activate the locking device 22, the steering handle 12 in the represented exemplary embodiments is arranged so as to be axially movable (with respect to the steering system axis A, in whose direction the steering column 14 extends). The locking device 22 in a first axial position of the steering handle 12 according to FIGS. 1, 2, 5, 7 and 9 enables a relative rotation between the input shaft 16 and the body-mounted steering system blocking element 20, and in a second axial position of the steering handle 12 according to FIGS. 3, 4, 6, 8 and 10 it blocks a relative rotation between the input shaft 16 and the body-mounted steering system blocking element 20. The steering handle 12 in the second axial position has in this case a shorter axial distance from the output shaft 18 than in the first axial position.

In the exemplary embodiments represented, the locking device 22 is designed as a coupling, especially a jaw coupling.

According to FIGS. 1 to 10, the locking device 22 is composed of a locking barrel 24, connected fixedly to the input shaft 16, as well as body-mounted locking pins 26. The locking barrel 24 has axial slots 28 in which the locking pins 26 can engage upon a corresponding rotational position of the steering handle 12. Once the locking pins 26 have engaged in the slots 28, no significant rotary movement of the input shaft 16 and the steering handle 12 is possible any longer. The input shaft 16 and the steering handle 12 are in this case displaced as much as possible in the axial direction toward the output shaft 18, according to FIGS. 3 and 4, for example. On the other hand, the steering handle 12 and the input shaft 16 can rotate freely when they are moved as far as possible in the axial direction away from the output shaft 18, according to FIGS. 1 and 2, for example.

Specifically, the locking barrel 24 has two oppositely positioned axial slots 28 (i.e., extending in the axial direction of the steering column 14), and the body-mounted steering system blocking element 20 comprises two oppositely positioned locking pins 26, which extend in the radial direction (radially with respect to the steering column 14) and border in each case axially on the slots 28 in the middle position of the steering handle 12 represented each time. Accordingly, an axial displacement of the steering handle 12 from the first axial position into the second axial position is possible, especially when the motor vehicle is on a straight road. Since, in the present exemplary embodiment as can be seen, two locking pins 26 and slots 28 are provided which are diametrically opposite one another with respect to the steering column 14, theoretically an axial displacement into the second axial position would also be conceivable in the event of a strong deflection of the steering handle 12 by approximately 180°. This is generally unwanted and can be prevented for example by use of a detent device 30, suitably activated by an electronic control unit, as shall be explained in greater detail below.

Figure 2:
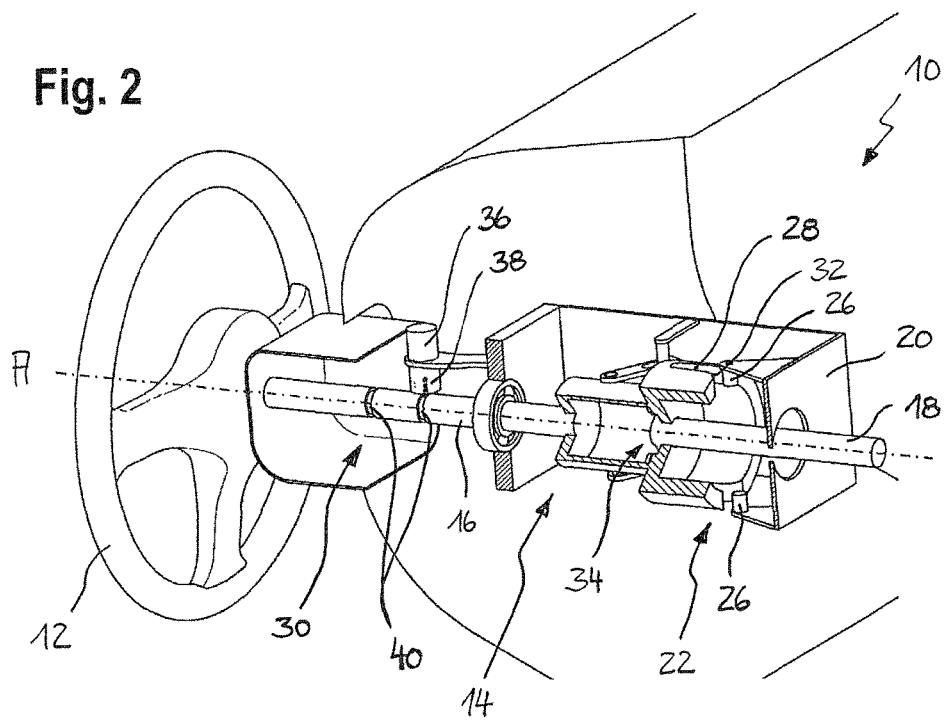
FIG. 2 is a further schematic sketch of the steering system according to FIG. 1 in the shifted state for "manual driving".

As is indicated for example in FIGS. 1 and 2, the slots 28 can have entry bevels 32 bordering on an axial rim of the locking barrel 24, which make possible an axial displacement from the first axial position into the second axial position even with slight angular departures of the steering handle 12 from the straight-ahead position and in this case rotate the steering handle 12 into its middle position (=exact straight-ahead position).

The steering system 10 moreover includes a coupling device 34, which can optionally enable or block a relative rotation between the input shaft 16 and the output shaft 18. The coupling device 34 and the locking device 22 are mechanically, electrically or electronically coupled together in this case by an electronic control unit so that the coupling device 34 assumes its enabled position in a blocked position of the locking device 22 and its blocked position in an enabled position of the locking device 22.

Consequently, the motor vehicle steering system 10 has a first shifted state in which the steering handle 12 is connected in a substantially firm manner against twisting to the output shaft 18 and can be rotated relative to the body-mounted steering system blocking element 20, as well as a second shifted state in which the steering handle 12 is fixed firm against twisting to the body-mounted steering system blocking element 20, wherein the output shaft 18 can be rotated relative to the steering handle 12 by means of a suitable actuator. The first shifted state of the steering system 10 is assigned to "manual driving", during which the driver actively steers the motor vehicle by the steering handle 12, while the second shifted state is assigned to "highly automated driving", during which the steering system 10 of the motor vehicle and its steering process is actuated or undertaken automatically by an onboard computer without the involvement of the driver. In this case, in order to prevent a feedback to the driver upon automatic adjustment of the steerable motor vehicle wheel 13, such as a visible and/or perceptible turning of the steering handle 12, the steering handle 12 or the input shaft 16 is decoupled from the output shaft 18. Moreover, the steering handle 12 is fixed, firm against twisting, on the body-mounted steering system blocking element 20, so that this stands advantageously rigid during the highly automated driving and can serve for example as a stable and fixed support for the driver. An unintentional manual steering intervention by the driver is advantageously precluded in this second shifted state of the steering system 10.

As already mentioned above and represented in FIGS. 1 to 10, the motor vehicle steering system 10 has a detent device 30, which fixes the steering handle 12 axially in the first and second axial position (of the input shaft 16). The detent device 30 in the exemplary embodiments represented can be activated electromagnetically, being actuated by an electronic control unit, and it can optionally enable or block an axial displacement of the steering handle 12 (with input shaft 16), starting from the first or second axial position.

Specifically, the detent device 30 includes an electromagnetic actuator 36 with a radially movable bolt 38 (with respect to the steering column 14), as well as two grooves 40 fashioned in the input shaft 16 and extending in the circumferential direction, in which the bolt 38 can engage in order to fix the steering handle 12 in its first or second axial position or hold the steering system 10 in its first or second shifted state.

The detent device 30 is actuated by an already mentioned electronic control unit in consideration of suitable signals of a vehicle sensor system and it thereby enables or prevents an axial adjustment of the steering handle 12 depending on predetermined parameters. Relevant parameters include the current steering angle or the speed of the vehicle, so that the detent device 30 for example enables an axial adjustment of the steering handle 12 substantially only when traveling straight ahead and at low vehicle speeds, and otherwise prevents a changing of the shifted state of the steering system 10, i.e., the axial position of input shaft 16 and steering handle 12.

In order to make sure that the steering handle 12 assumes either its first axial position according to FIGS. 1, 2, 5, 7 and 9 or its second axial position according to FIGS. 3, 4, 6, 8 and 10 and no undefined intermediate position in between, a so-called dead center device 42 is provided in the exemplary embodiments represented for the steering system 10. The dead center device 42 assumes an unstable position of equilibrium between the first and second axial position of the steering handle 12 and forces the steering handle 12 into the first or second axial position outside of the unstable position of equilibrium. The functioning of the dead center device 42 is especially clearly evident from a direct comparison of FIGS. 1 and 3. One notices here an L-shaped lever fastened pivotably to the outer wall of a segment of the input shaft 16 which is configured in the form of a hollow cylinder and is thus broadened in the radial direction, whose first leg fastened pivotably to said hollow cylinder has an elongated hole, which engages with a bolt fastened on the steering system blocking element 20. The other leg standing at right angles to the aforementioned leg of said lever lies against a compression spring element, to which the arrow of reference number 42 points in FIG. 3. Thus, it is clearly noticeable that, upon movement of the steering handle 12 from the position shown in FIG. 1 to the position shown in FIG. 3 or back, this compression spring element is at first compressed until such time as the first mentioned leg of said lever stands perpendicular to the axis A of the steering column 14, and is relaxed once more upon further approach to the other end position.

Alternatively to the represented dead center device 42, one can also use a plate spring with suitable spring characteristic. Moreover, variant embodiments of the steering system 10 are also contemplated in which instead of the detent device 30 and the dead center device 42, an electromechanical drive unit is provided for the axial displacement of the steering handle 12 and which is designed so that it constantly moves the steering handle into one of the two end positions.

Figure 3:
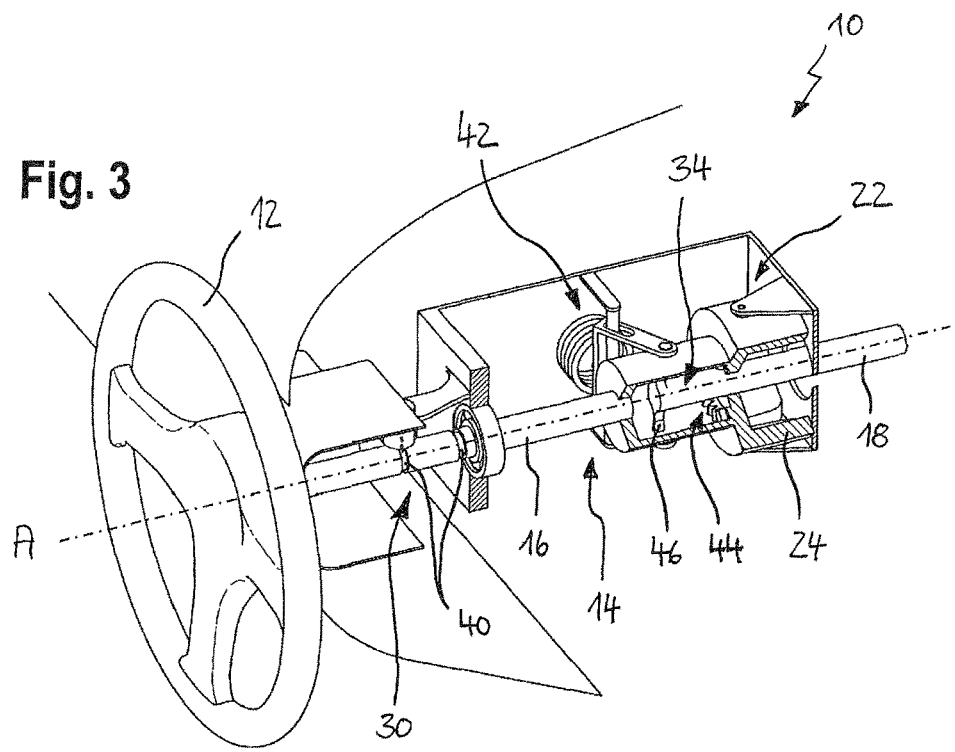
FIG. 3 is a schematic sketch of the steering system according to FIG. 1 in a shifted state for "highly automated driving".
Figure 4:
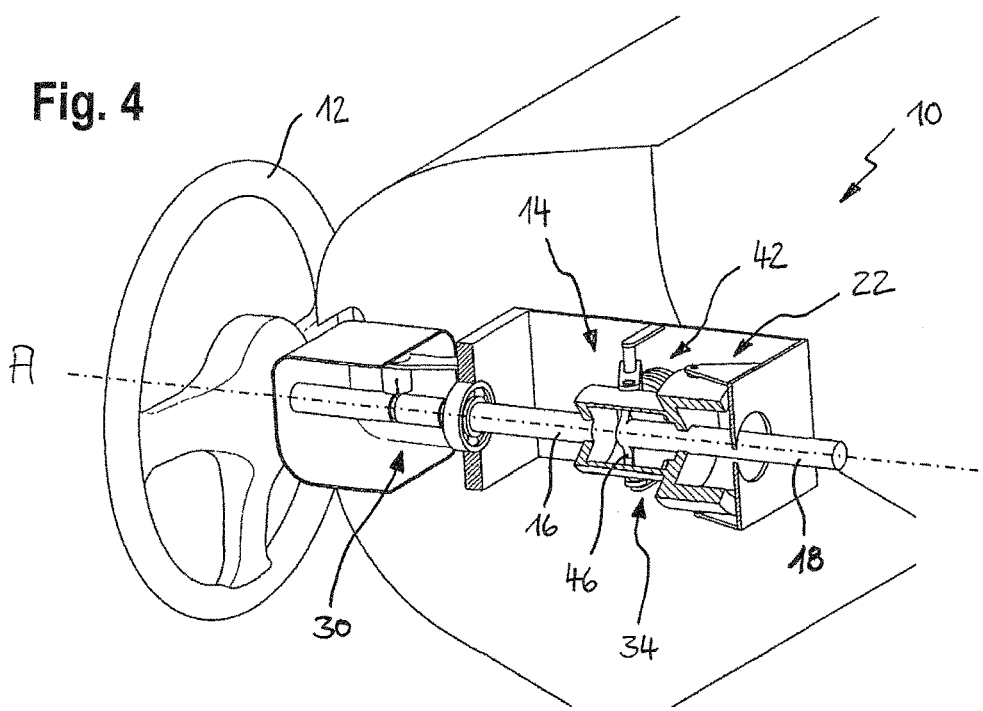
FIG. 4 is a further schematic sketch of the steering system according to FIG. 1 in the shifted state for "highly automated driving".

FIGS. 1 to 4 show the steering system 10 for a motor vehicle according to a first embodiment, in which the steering handle 12 is arranged so as to be axially movable for the actuating of the coupling device 34 and the coupling device 34 is designed as a coupling in the manner of a jaw coupling. It is especially clear from FIGS. 1 and 3 that the jaw coupling 34 has a finely divided toothed rim 44 fixedly connected to the input shaft 16, which is provided on the inner wall of the section of the input shaft 16 already mentioned and broadened in the form of a hollow cylinder, and which can engage in practically any desired angular position with the coupling jaws 46, which are fixedly connected to the output shaft 18. In the present exemplary embodiment, two such coupling jaws 46 diametrically opposite each other are provided at the end face of the output shaft 18, facing the input shaft 16, as can be seen in FIGS. 3 and 4, which show the decoupled state. The coupling and decoupling of the coupling device occurs in this case with an axial movement of the steering handle 12 with the input shaft 16 relative to the axially immovable output shaft 18.

Furthermore, it is evident from FIGS. 1 to 4 that the coupling device 34 in the first axial position of the steering handle 12 blocks a relative rotation between the input shaft 16 and the output shaft 18 (see FIGS. 1 and 2—here the coupling jaws 46 engage in the toothed rim 44) and in the second axial position of the steering handle 12 it enables a relative rotation between the input shaft 16 and the output shaft 18 (see FIGS. 3 and 4—here the coupling jaws 46 are located away from the toothed rim).

FIGS. 5 to 10 show alternative embodiments of the steering system 10 for a motor vehicle which differ from the first embodiment according to FIGS. 1 to 4 in that the coupling device 34 is designed not as a jaw coupling, but rather as a superposition gear or in the manner of such a superposition gear.

Figure 5:
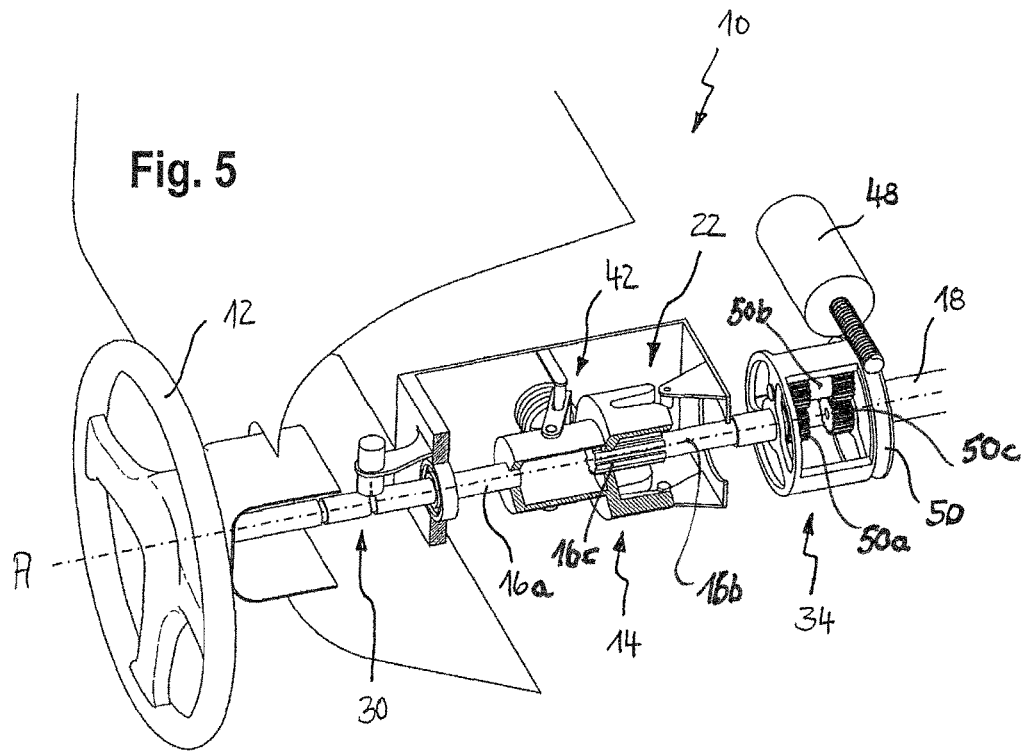
FIG. 5 is a schematic sketch of a second embodiment of the steering system according to the invention in a shifted state for "manual driving".
Figure 6:
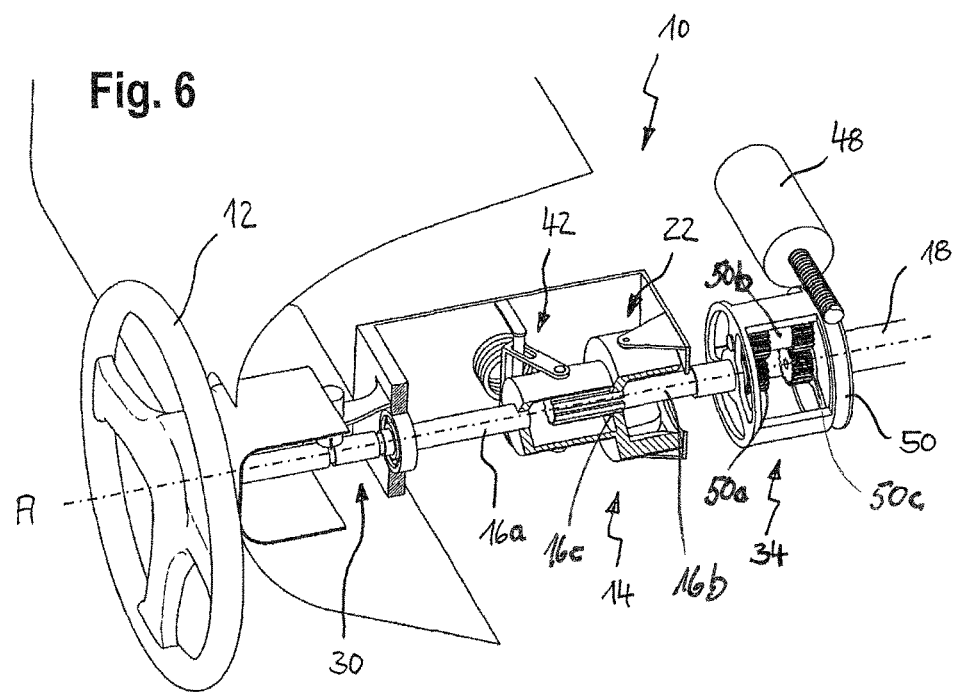
FIG. 6 is a further schematic sketch of the steering system according to FIG. 5 in a shifted state for "highly automated driving".

FIGS. 5 and 6 show a second embodiment in which the superposition gear for the electromechanical actuating of the steering system 10 comprises a drive unit 48 as well as a sleevelike superposition ring 50 or one configured in the manner of a hollow cylinder. By its left-side end segment shown in the figures, the superposition ring 50 is mounted rotatably on a stub axle 16*b* of the two-piece input shaft 16 in the exemplary embodiments according to FIGS. 5 to 10. The stub axle 16*b* here is not axially movable, but instead only a partial segment 16*a* of the input shaft associated with and facing the steering handle 12 is axially movable along with the steering handle 12. This partial segment 16*a* of the input shaft 16 as well as its stub axle 16*b* are suitably coupled together by a suitable spline shaft profile 16*c*, which is provided between the already mentioned locking barrel 24 of the partial segment 16*a* of the input shaft 16 and the stub axle 16*b* and connects the partial segment 16*a* in typical fashion, firm against twisting, to the stub axle 16*b* and at the same time allows a relative axial movement between these two components.

The superposition ring 50 has a suitable toothing on its outside, with which the drive unit 48 meshes, so that the superposition ring 50 can be rotated by the drive unit 48 relative to the stub axle 16*b* and thus about the steering system axis A. Due to its advantageous self-locking properties, the drive unit 48 is designed especially as a worm drive, while the not separately indicated worm of the drive unit 48, with which the toothing of the superposition ring 50 meshes, can be suitably driven by way of an electric motor and actuated by an electronic control unit.

Inside the superposition ring 50, there is provided at first a drive pinion 50*a* lying on the steering system axis A, which is rigidly connected to the end of the stub axle 16*b* away from the partial segment 16*a*. This drive pinion 50*a* meshes with a first gear of a transmission shaft 50*b*, which is rotatably mounted in the superposition ring 50—more precisely, in its two end faces—on the other side of the steering system axis A and parallel to the latter. At the other end of this transmission shaft 50*b* and lying inside the superposition ring 50 is provided a further gear, which meshes with an output pinion 50*c* rotatably mounted on the steering system axis A in the superposition ring 50. This output pinion 50*c*, in turn, is connected firm against twisting to the output shaft 18 of the steering system 10.

Thus, in the exemplary embodiment according to FIGS. 5 and 6, if the self-locking drive unit 48 is stationary and thus the superposition ring 50 is blocked against turning about the steering system axis A, a rotary movement (not blocked by the locking device 22 according to FIG. 5) of the stub axle 16*b* of the input shaft 16 is transmitted unchanged by the transmission shaft 50*b* to the output shaft 18. On the other hand, if the locking device 22 according to FIG. 6 blocks the stub axle 16*b* or its rotary movement, so that the latter stands still, the output shaft 18 can still rotate if a rotary movement of the superposition ring 50 about the steering system axis is made possible. Such a rotary movement of the superposition ring 50 is possible when the drive unit 48 is suitably active, i.e., it suitably actively turns the superposition ring 50. Thus, advantageously, the output shaft 18 can also be turned as desired by way of the drive unit 48 in order to represent a desired steering deflection on the steerable vehicle wheel 13. Thus, a single additional electric positioning motor in the steering system, which acts as a servo motor and assists the driver torquewise during steering by the driver, is sufficient; no further redundancy is therefore required in the steering system for the highly automated driving mentioned at the outset.

FIGS. 7 and 8 show a third embodiment in which once more the superposition ring 50 with the components arranged inside it (drive pinion 50*a*, transmission shaft 50*b*, output pinion 50*c*) is provided as a coupling device 34 similar to the exemplary embodiment of FIGS. 5 and 6, but, instead of the drive unit 48 there, merely a blocking unit 52 is provided. Thus, this is no longer a superposition gear to its full extent. Instead, the blocking unit can optionally enable or block a rotation or rotary movement of the superposition ring 50 about the steering system axis A.

Figure 9:
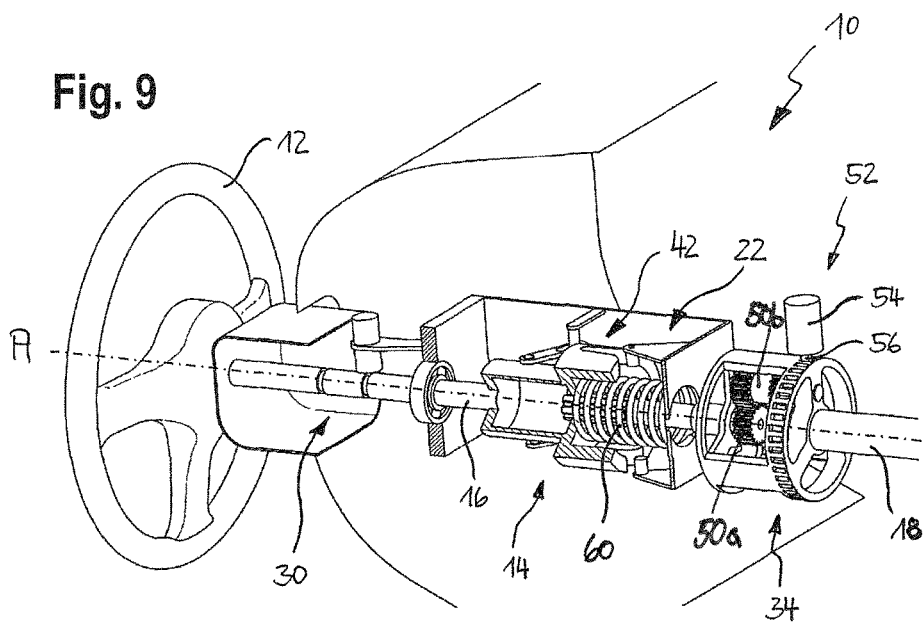
FIG. 9 is a schematic sketch of a fourth embodiment of the steering system according to the invention in a shifted state for "manual driving".
Figure 10:
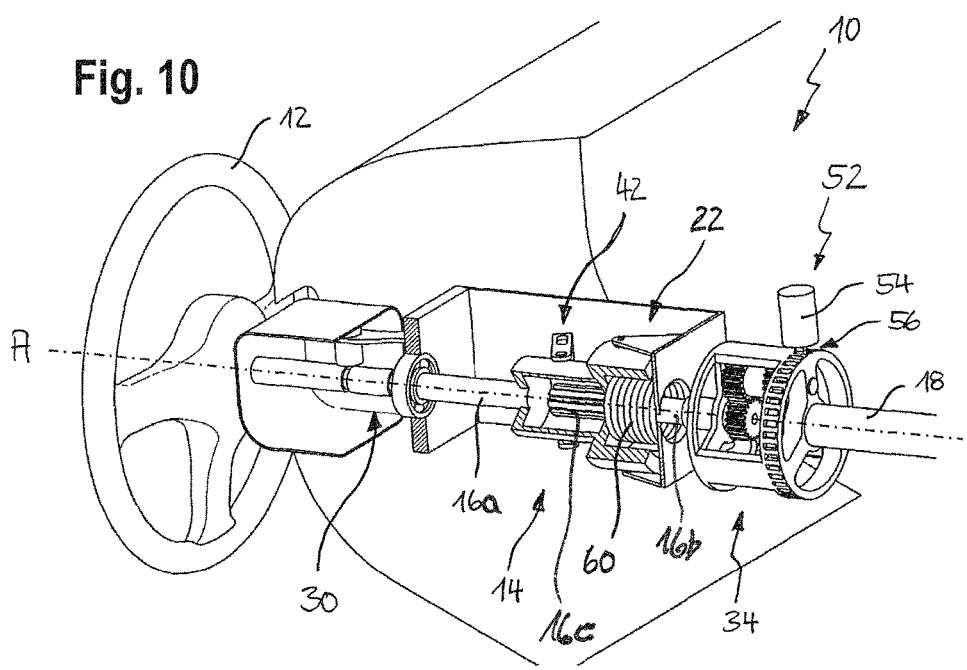
FIG. 10 is a further schematic sketch of the steering system according to FIG. 9 in a shifted state for "highly automated driving".

The blocking unit 52 in the exemplary embodiment shown is an electromagnetically actuated blocking unit 52 with an electromagnetic actuator 54 and a radially (with respect to the steering system axis A) movable bolt 56, which in the first shifted state of the steering system 10 for manual driving engages in a toothing 58 of the superposition ring 50 (see FIGS. 7 and 9) and in the second shifted state of the steering system 10 for highly automated driving does not engage in the toothing 58 of the superposition ring 50 (see FIGS. 8 and 10). In the first shifted state, the relations are thus similar to that explained for FIG. 5, while in the second shifted state the superposition ring 50 can turn freely, so that the output shaft 18 can also turn freely, while the input shaft 16 and its stub axle 16*b* is blocked against turning. In departure from the sample embodiment according to FIGS. 5 and 6, however, at least one independent drive unit (and de facto two, for redundancy reasons) is required here for the output shaft 18.

Finally, FIGS. 9 and 10 show a fourth embodiment which merely differs from the steering system 10 according to FIGS. 7 and 8 in that a spring element 60 is provided additionally, which applies spring force to the steering handle 12 and the partial segment 16*a* of the input shaft in the direction of its first axial position according to FIG. 9. Due to the spring element 60, the steering system 10 can be converted with no action on the part of the driver from the second shifted state for highly automated driving (FIG. 10) into the first shifted state for manual driving (FIG. 9), in which case the driver of course should be made aware optically, acoustically, and/or haptically of a corresponding change in the shifted state of the steering system 10. This function is especially advantageous when in the second shifted state of the steering system 10 for highly automated driving a redundancy system fails and the steering system 10 has to be shifted to manual driving, optionally observing a certain prewarning time.

In such an instance, a "skewed state" of the steering handle 12 may arise under certain circumstances, i.e., a state in which a middle position of the steering handle 12 does not match up with a straight-ahead movement of the motor vehicle. In embodiments in which the coupling device 34 is designed as a superposition gear with drive unit 48, this skewed state of the steering handle 12 of the steering system can be corrected once again during travel.

In variant embodiments according to FIGS. 1 to 4, it is contemplated that the driver will be prompted to stop at the next available opportunity and place the steering handle 12 in its middle position. By shifting the coupling device 34 to its enabled position, the steering angle of the steerable motor vehicle wheel 13 can then be adjusted by means of the (already present) electromechanical steering gearbox to the position of the steering handle 12 adapted to straight-ahead movement.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A steering system for a vehicle equipped with a steering handle for manual actuation of the steering system, comprising:
   at least one steerable vehicle wheel which is mechanically coupleable to the steering handle;
   a steering column which is rotatable about a steering system axis and has an input shaft connected fixedly to the steering handle and an output shaft which is coupleable to the input shaft and whose rotary movement produces a steering movement of the steerable vehicle wheel via a steering gearbox;
   a steering system blocking element, which is connected fixedly to a body of the vehicle;
   a locking device, which optionally enables or blocks a relative rotation between the input shaft and the steering system blocking element; and
   a coupling device, which optionally enables or blocks a relative rotation between the input shaft and the output shaft.

2. The steering system according to claim 1, wherein
   the steering handle is arranged so as to be axially movable for the actuation of the locking device,
   the locking device, in a first axial position of the steering handle, enables a relative rotation between the input shaft and the body-mounted steering system blocking element and, in a second axial position of the steering handle, blocks a relative rotation between the input shaft and the body-mounted steering system blocking element, and
   the steering handle in the second axial position, has a shorter axial distance from the output shaft than in the first axial position.

3. The steering system according to claim 1, wherein the locking device is a jaw coupling.

4. The steering system according to claim 2, further comprising:

a detent device, which axially fixes the steering handle in the first axial position and/or in the second axial position.

5. The steering system according to claim 4, wherein the detent device is an electromagnetically actuated detent device that selectively enables or blocks an axial displacement of the steering handle.

6. The steering system according to claim 2, further comprising:
a spring element, which forces the steering handle into the first axial position.

7. The steering system according to claim 2, wherein the steering handle is movable between the first and second axial positions, and
a dead center device assumes an unstable position of equilibrium between the first and second axial positions of the steering handle and forces the steering handle into the first or second axial positions outside of the unstable position of equilibrium.

8. The steering system according to claim 1, wherein the coupling device is a jaw coupling.

9. The steering system according to claim 8, wherein the coupling device, in a first axial position of the steering handle, blocks a relative rotation between the input shaft and the output shaft and, in a second axial position of the steering handle, enables a relative rotation between the input shaft and the output shaft.

10. The steering system according to claim 1, wherein the coupling device is designed as a superposition gear.

11. The steering system according to claim 1, wherein the coupling device and the locking device are mechanically, electrically or electronically coupled together so that the coupling device assumes its enabled position in a blocked position of the locking device, and vice versa.

12. The steering system according to claim 2, wherein the vehicle has an electric motor adjustable driver's seat, in the case of the second axial position of the steering handle, in which the steering handle has a shorter axial distance from the output shaft than in the first axial position, the driver's seat is moved into a position in which it is also further away from the output shaft, viewed axially, than in the first axial position of the steering handle.

13. The steering system according to claim 1, further comprising:
an electronic control unit, which only enables an axial displacement of the steering handle toward the output shaft when the vehicle can move in a highly automated driving mode, and/or which automatically initiates an axial displacement of the steering handle away from the output shaft when an error monitoring system for the highly automated driving mode of the vehicle identifies a safety-relevant error.

14. The steering system according to claim 2, wherein the steering handle, in the second axial position, lies at least partially and at least approximately flush in a dashboard of the vehicle at a shorter axial distance from the output shaft, and
an indicator and/or operating unit for the driver is moved out of the dashboard when the steering handle lies at least partially and at least approximately flush in the dashboard.

* * * * *